United States Patent
Ling et al.

(10) Patent No.: US 6,865,588 B2
(45) Date of Patent: Mar. 8, 2005

(54) ADAPTIVE FILTERING WITH TAP LEAKAGE USING ERROR FILTERING

(75) Inventors: Stanley K. Ling, Rocklin, CA (US); Hiroshi Takatori, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 599 days.

(21) Appl. No.: 10/037,656

(22) Filed: Jan. 3, 2002

(65) Prior Publication Data

US 2003/0126170 A1 Jul. 3, 2003

(51) Int. Cl.[7] .............................................. G06F 17/10
(52) U.S. Cl. ...................................................... 708/322
(58) Field of Search ................. 708/322–323; 375/229–236

(56) References Cited

U.S. PATENT DOCUMENTS

| | | | |
|---|---|---|---|
| 4,747,068 A | | 5/1988 | Voorman et al. |
| 4,779,225 A | | 10/1988 | Fukasawa et al. |
| 4,939,685 A | | 7/1990 | Feintuch |
| 4,947,363 A | | 8/1990 | Williams |
| 5,282,155 A | * | 1/1994 | Jones ........................ 708/322 |
| 5,506,871 A | * | 4/1996 | Hwang et al. ............. 708/322 |
| 6,285,709 B1 | * | 9/2001 | Alelyunas et al. ......... 708/323 |
| 6,798,832 B1 | * | 9/2004 | Nakata et al. ............. 708/323 |

OTHER PUBLICATIONS

"The Tap–Leakage Algorithm: An Algorithm for the Stable Operation of a Digitally Implemented, Fracionally Spaced Adaptive Equalizer" by R.D. Gitlin, et al.
The Bell System Technical Journal, vol. 61, Oct. 1982, No. 8.
"Adaptive Equalization" by Shahid U. H. Qureshi, Jul. 16, 1984, Transmission Products, Codex Corporation, Mansfield, MA.

* cited by examiner

*Primary Examiner*—Tan V. Mai
(74) *Attorney, Agent, or Firm*—Blakely, Sokoloff, Taylor & Zafman LLP

(57) ABSTRACT

In one embodiment of the invention, a tap-leakage generator includes an error filter and an updater. The error filter filters a decision error provided by the adaptive filter using a leakage factor. The adaptive filter has N taps. The updater updates N equalizer coefficients to the N taps using the filtered decision error. The updater receives N equalizer data from the N taps.

44 Claims, 5 Drawing Sheets

ADAPTIVE FILTERING WITH TAP LEAKAGE USING ERROR FILTERING

BACKGROUND

1. Field of the Invention

This invention relates to adaptive filtering. In particular, the invention relates to adaptive filtering with tap leakage.

2. Description of Related Art

Adaptive filters may be used in a number of applications such as adaptive equalization in digital communications systems. Adaptive filters are typically implemented as a non-recursive filter having N taps. For example, the adaptive filter may be a fractionally spaced equalizer having tap weights spaced a fraction of a symbol. The fractional spaced equalizer provides better performance than conventional symbol synchronous equalizers in the presence of severe linear distortion. The adaptive filter may have N equalizer coefficients that are updated or adjusted according to the input signal. The adaptive filter prevents the buildup of large coefficient values by systematically adjusting the magnitudes of all the equalizer tap weights or equalizer coefficients. However the systematic adjustment may cause output overflow, leading to substantially degraded performance.

A technique to solve this problem includes preventing the buildup of large coefficient values through systematically "leaking" or decreasing the magnitudes of the equalizer tap weights. This technique has a number of disadvantages. First, it requires an additional multiplication for each tap-update. The number of additional operations becomes significant for large number of taps. Second, adding tap-leakage computations to pre-existing hardware blocks may be difficult, considering the number and complexity of additional required operations.

Therefore, there is a need to have an efficient technique to reduce the computations of the adaptive filter with tap leakage.

BRIEF DESCRIPTION OF THE DRAWINGS

The features and advantages of the present invention will become apparent from the following detailed description of the present invention in which.

DESCRIPTION

Figure 1:
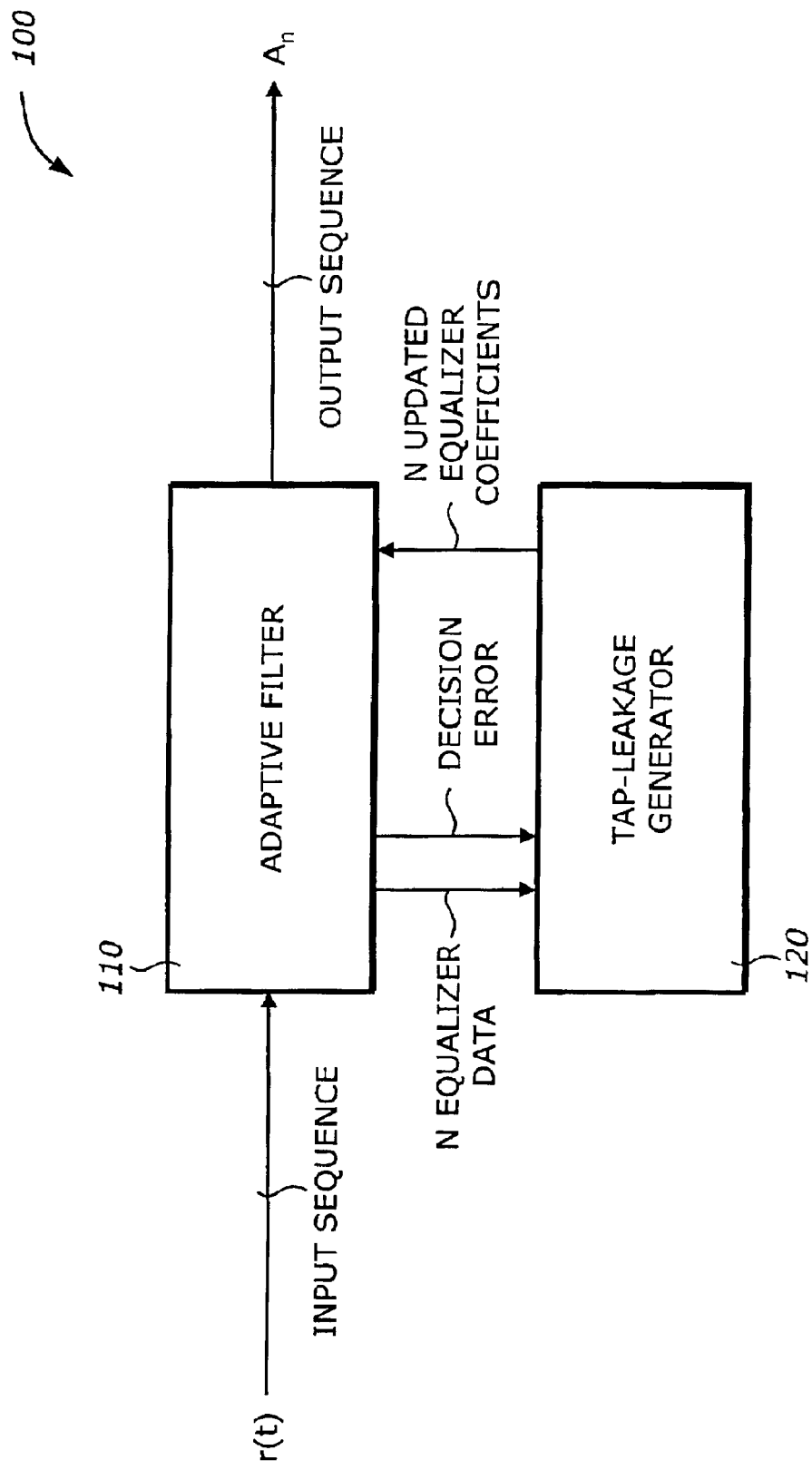
FIG. 1 is a diagram illustrating a system in which one embodiment of the invention can be practiced.

The present invention is a technique to implement a tap-leakage computation for adaptive filters. The complexity of the tap-leakage computation is reduced from N operations, where N is the number of taps in the adaptive filter, to a computation which is independent of filter length. In one embodiment of the invention, a tap-leakage generator has an error filter and an updater. The error filter is coupled to an adaptive filter having N taps to filter a decision error provided by the adaptive filter using a leakage factor. The updater updates N equalizer coefficients to the N taps using the filtered decision error. The updater receives the N equalizer data from the N taps.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

FIG. 1 is a diagram illustrating a system 100 in which one embodiment of the invention can be practiced. The system 100 includes an adaptive filter 110 and a tap-leakage generator 120.

The adaptive filter 110 receives an input signal and generates an output sequence. The adaptive filter 110 may be used in a number of applications such as adaptive equalization in a digital communications systems. The adaptive filter 110 is typically implemented as a non-recursive filter having N taps. An adaptive equalizer can be either symbol-spaced or fractionally spaced. A fractionally spaced equalizer has tap weights spaced a fraction of a symbol internal apart. The fractionally spaced equalizer provides better performance than the conventional symbol-spaced equalizer in the presence of severe linear distortion. The adaptive filter 110 is described here as a symbol-spaced equalizer, but the invention is valid for both symbol and fractionally spaced filters. The adaptive filter 110 has N equalizer coefficients that are updated or adjusted according to the input signal. The adaptive filter 110 prevents the buildup of large coefficient values by systematically adjusting the magnitudes of all the equalizer tap weights or equalizer coefficients. The adaptive filter 110 generates N equalizer data and a decision error to the tap-leakage generator 120.

The tap-leakage generator 120 updates the N equalizer coefficients used by the adaptive filter 110 using the N equalizer data and the decision error provided by the adaptive filter 110. The tap-leakage generator 120 uses an efficient procedure that employs less computations than the traditional update algorithm with tap-leakage.

Figure 2:
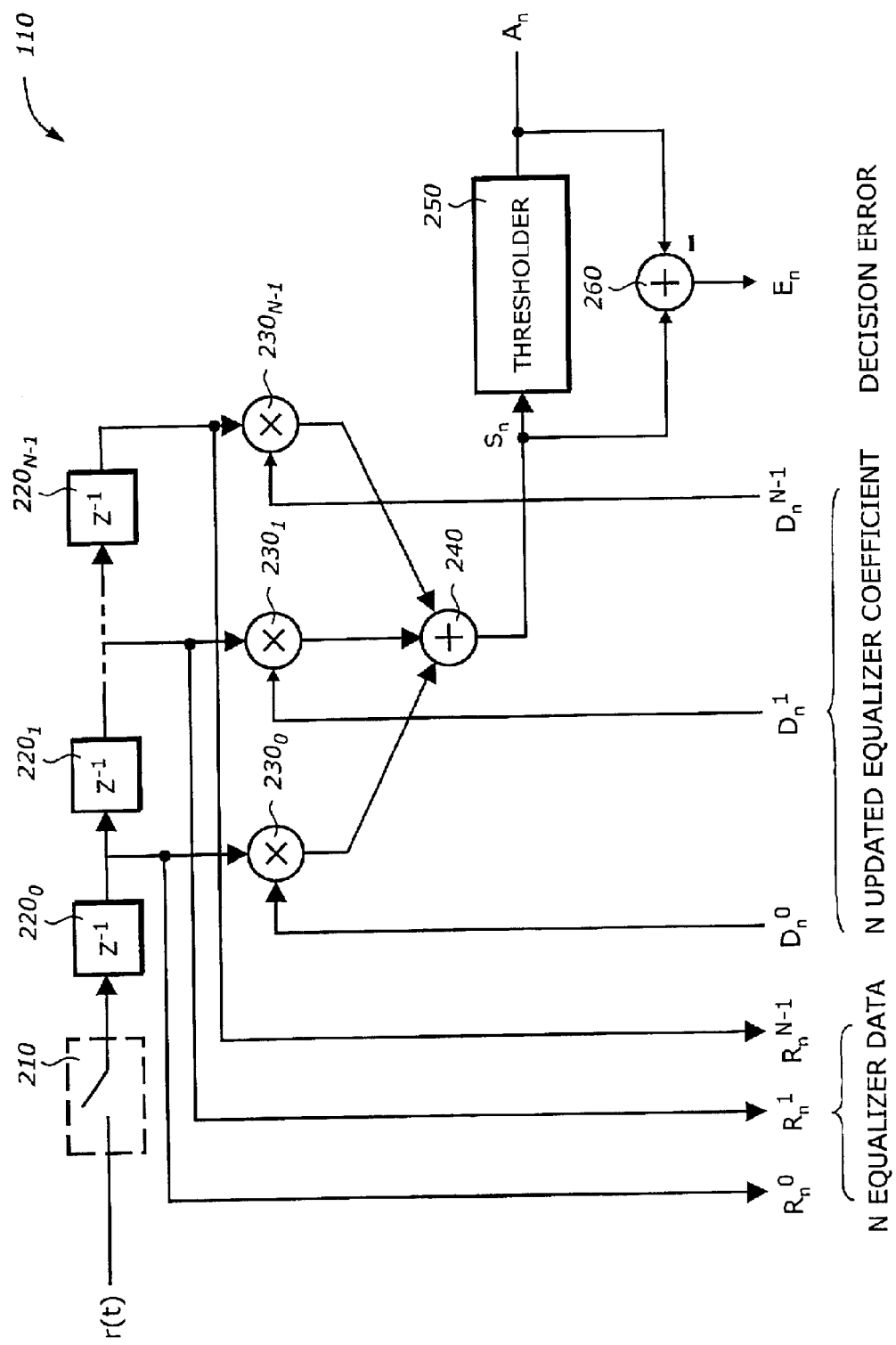
FIG. 2 is a diagram illustrating an adaptive filter shown in FIG. 1 according to one embodiment of the invention.

FIG. 2 is a diagram illustrating the adaptive filter 110 shown in FIG. 1 according to one embodiment of the invention. The adaptive filter 110 includes a sampler 210, N delay elements $220_0$ to $220_{N-1}$, N multipliers $230_0$ to $230_{N-1}$, an adder 240, a thresholder 250, and an adder 260.

The sampler 210 samples the input signal r(t) into a discrete-time sequence of input data. The sampling frequency is in accordance to the frequency of the input signal meeting the sampling Nyquist criteria. In one embodiment, this sampling frequency is at an integer multiple of the symbol rate corresponding to modem applications. The delay elements $220_0$ to $220_{N-1}$ each delays the input sequence by one sample time period. The sample time period is the sampling time interval of the sampler 210. The delay elements $220_0$ to $220_{N-1}$ may be implemented by a shift register, a number of flip-flops connected in cascade, or any other suitable elements. When implemented by software, the delay elements $220_0$ to $220_{N-1}$ may be implemented an array of elements. Each of the delay elements generates an equalizer data $R_n$. For N delay elements, there are N equalizer data $R_n^0$ to $R_n^{N-1}$.

Each of the multipliers $230_0$ to $230_{N-1}$ multiplies one of the equalizer coefficients $D_n^0$ to $D_n^{N-1}$ provided by the tap-leakage generator 120 with the corresponding equalizer data. For example, the multiplier $230_0$ multiplies the equalizer coefficient $D_n^0$ by the equalizer data $R_n^0$, $D_n^k$ with the equalizer data $R_n^k$, etc. The N equalizer coefficients $D_n^0$ to $D_n^{N-1}$ are provided by the tap-leakage generator 120.

The adder 240 adds all the products generated by the multipliers to provide a sum $S_n$. The thresholder 250 thresholds the sum $S_n$ to provide the output sequence $A_n$. The adder 260 adds the sum $S_n$ and the output sequence to provide a decision error $E_n$ at each sampling time.

Figure 3:
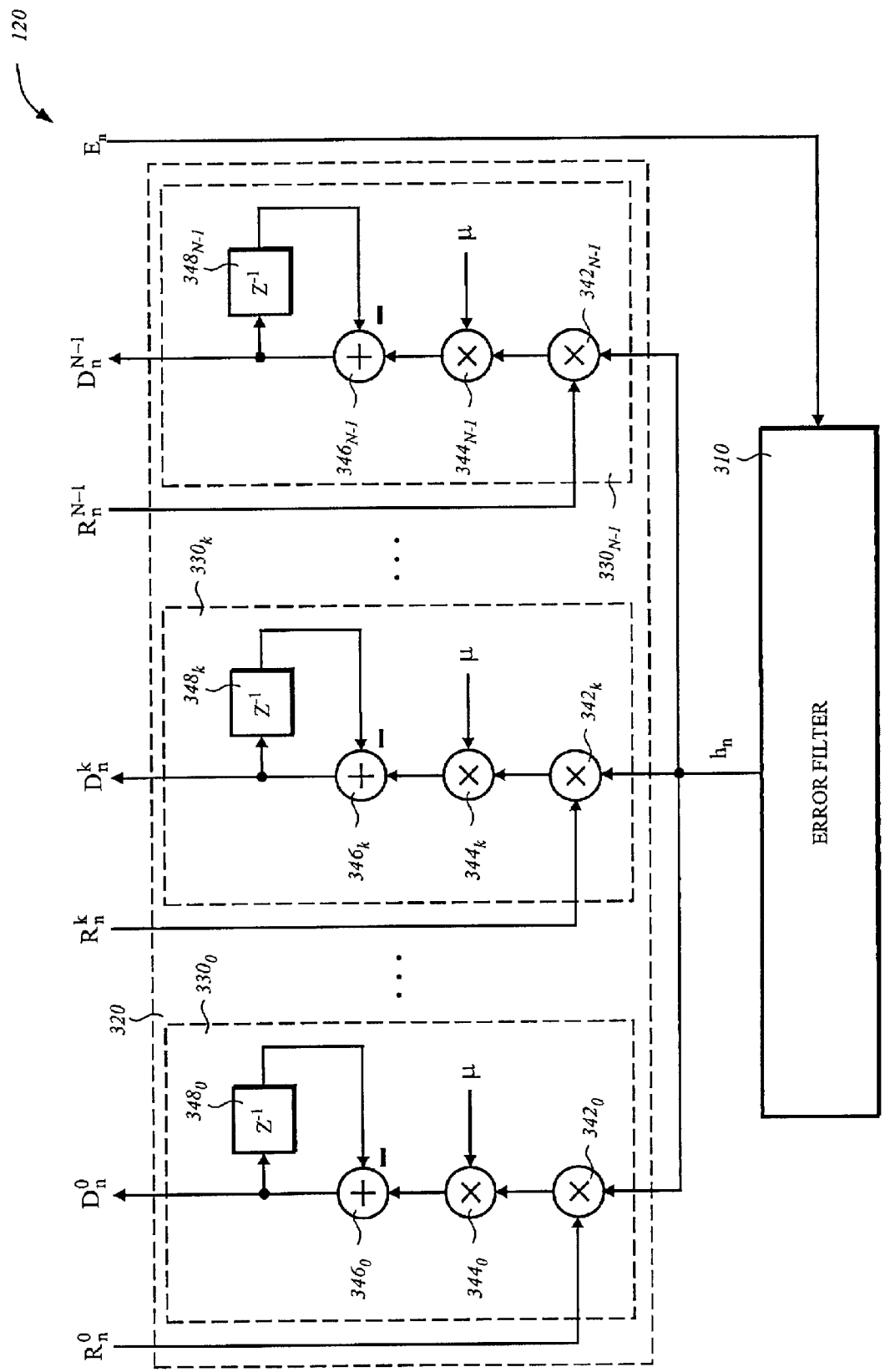
FIG. 3 is a diagram illustrating a tap-leakage generator shown in FIG. 1 according to one embodiment of the invention.

FIG. 3 is a diagram illustrating the tap-leakage generator 120 shown in FIG. 1 according to one embodiment of the invention. The tap-leakage generator 120 includes an error filter 310 and an updater 320.

The error filter 310 filters the decision error $E_n$ from the adaptive filter 110 using a leakage factor α. The error filter 310 generates a filtered decision error $h_n$ at each sampling time.

The updater 320 updates the vector of N equalizer coefficients $D_n^0$ to $D_n^{N-1}$ to the N taps using the filtered decision error $h_n$. The updater receives the N equalizer data from the N taps of the adaptive filter 110. The updater 320 includes N coefficient updaters $330_0$ to $330_{N-1}$. Each of the N coefficient updaters $330_0$ to $330_{N-1}$ generates a corresponding updated equalizer coefficient. For example, the coefficient updater 330k generates the equalizer coefficient $D_n^k$. Each of the N coefficient updaters $330_0$ to $330_{N-1}$ uses a corresponding equalizer data. All of the N coefficient updaters $330_0$ to $330_{N-1}$ use a same adaptive step size parameter μ and the filtered decision error $h_n$.

In the conventional tap-leakage procedure, the updated equalizer coefficients are determined by the following equation:

$$\underline{C}_{n+1} = \alpha * \underline{C}_n - \mu * E_n * \underline{R}_n \qquad (1)$$

where:

$\underline{C}_n$ is the vector of equalizer coefficients at time n, $\underline{C}_n^T = [C_n^0 \; C_n^1 \; \ldots \; C_n^{N-1}]$
where T denote vector transposition.

$\underline{R}_n$ is the vector of equalizer data at time n, $\underline{R}_n^T = [R_n^0 \; R_n^1 \; \ldots \; R_n^{N-1}]$ $E_n$ is the decision error at time n μ is the adaptive step size parameter α is the leakage factor, 0.0<α<1.0.

* is the multiplication operation.

The conventional tap leakage procedure includes the multiplication of α in each of the update path for the equalizer coefficients. The z-transform of the update path can be written as:

$$\underline{C}_n * z^{-1} = \alpha * \underline{C}_n - \mu * E_n * \underline{R}_n \qquad (2)$$

or:

$$\underline{C}_n = -\mu * E_n * \underline{R}_n z^{-1}/(1 - \alpha * z^{-1}) \qquad (3)$$

The updater 320 removes the multiplication of α from each of the update paths. In addition, the error filter 310 is used to incorporate the leakage factor α. For the tap-leakage generator 120, the equalizer coefficients are now defined as $\underline{D}_n$ where $\underline{D}_n^T = [D_n^0 \; D_n^1 \; \ldots \; D_n^{N-1}]$. The least mean square (LMS) tap update for the leakage generator 120 is written as:

$$\underline{D}_{n+1} = \underline{D}_n - \mu * h_n * \underline{R}_n \qquad (4)$$

where $h_n$ is the filtered decision error.

The Z-transform of the filtered decision error, $h_n$ is:

$$h_n = E_n * h(z) \qquad (5)$$

Taking the z-transform of equation (4) to obtain:

$$D_n * z^{-1} = \alpha * D_n - \mu * E_n * H(z) * R_n \qquad (6)$$

or:

$$D_n = \frac{-\mu * E_n R_n z^{-1}}{1 - z^{-1}} * H(z) \qquad (7)$$

Setting the coefficients $C_n$ equal to $D_n$ and solving for H(z) to obtain:

$$H(z) = \left( \frac{1 - z^{-1}}{1 - \alpha * z^{-1}} \right) \qquad (8)$$

The block H(z) is the error filter 310 which is a first order high pass filter (HPF) with a zero at zero frequency or direct current (DC) frequency and a pole determined by the leakage factor α.

For $C_n$ to be identically equal to $D_n$, the transfer function from $E_n$ to $C_n$ (and also $E_n$ to $D_n$) needs to be linear and time-variant. This is not truly the case because $R_n$ is not limited to a constant value. However, since the LMS algorithm stochastically estimates the gradient of the data-error product, only the time-average of the data-error product is of concern, and being strictly linear, time-invariant is not required.

The updater 320 therefore eliminates N multiplications due to α and the computation for the error filter 310 is reduced to only three computations. This represents a significant saving when N is large as is typical in adaptive equalization.

Each of the coefficient updater 330k includes a first multiplier 342k, a second multiplier 344k, an adder 346k and a delay element 348k. The first multiplier 342k multiplies a corresponding one of the equalizer data $R_n^k$ with the filtered decision error $h_n$ to provide a first product. The second multiplier 344k multiplies the first product with the adaptive step size μ to provide a second product. The delay element 348k delays the updated equalizer coefficient $D_n^k$ to provide a delayed coefficient. The subtractor 346k subtracts the second product from the delayed coefficient to provide the updated filtered coefficient $D_n^k$. As seen, the multiplication of the leakage factor α is eliminated. The computation of the updated equalizer coefficient for tap j is given by the following equation:

$$D_n^j = D_{n-1}^j - \mu * h_n * R_n^i \quad (9)$$

Figure 4:
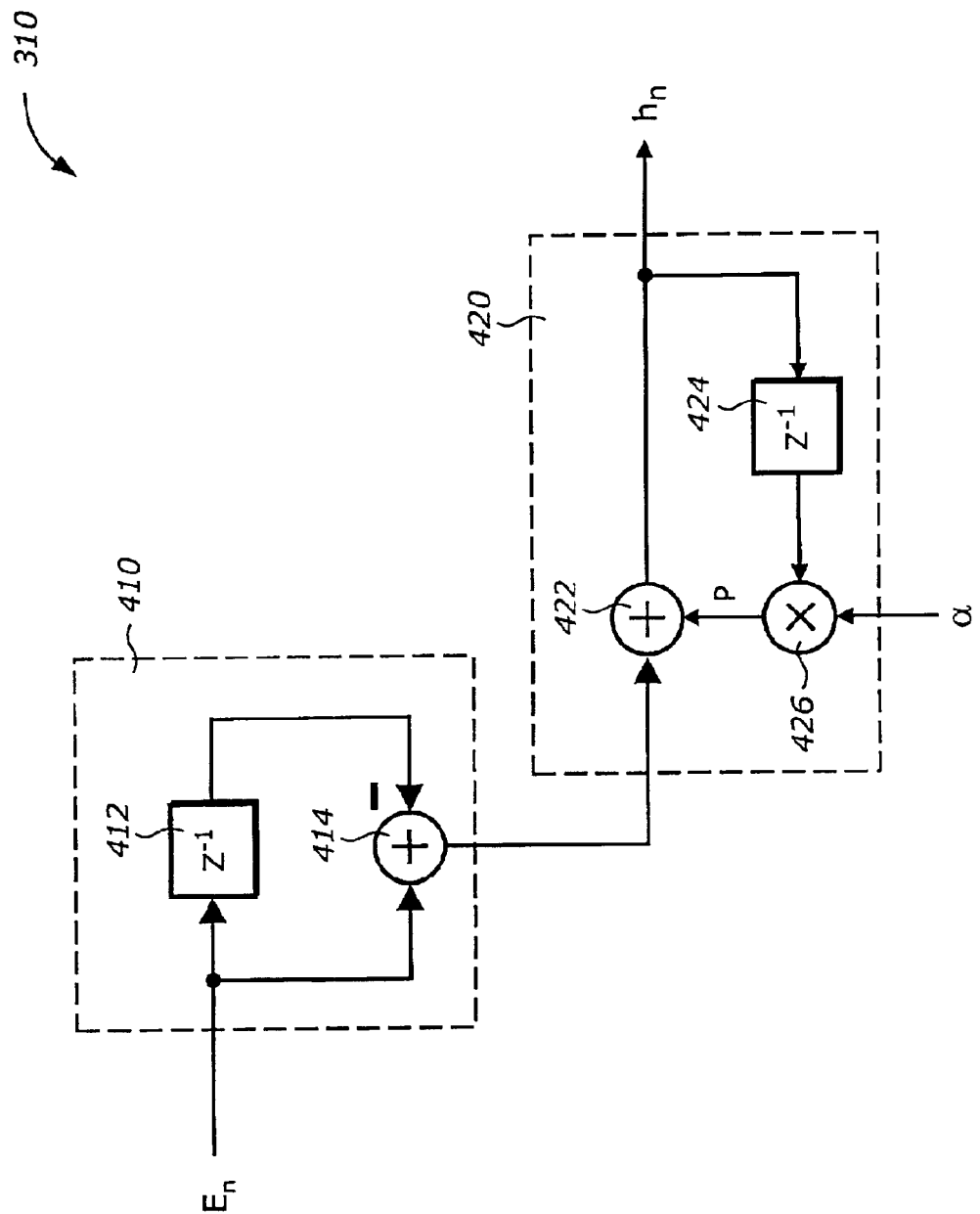
FIG. 4 is a diagram illustrating an error filter shown in FIG. 3 according to one embodiment of the invention.

FIG. 4 is a diagram illustrating the error filter 310 shown in FIG. 3 according to one embodiment of the invention. The error filter 310 is essentially a first-order high pass filter and can be implemented by a number of methods. In one embodiment, the error filter 310 includes first and second computing elements 410 and 420.

The error filter 310 filters the decision error $E_n$ to generate the filtered decision error $h_n$. The filtered decision error $h_n$ is used by all the coefficient updaters $330_0$ to $330_{N-1}$ as shown in FIG. 3. The difference equation for the error filter 310 can be obtained by taking the inverse Z-transform of equation (9):

$$h_n = E_n - E_{n-1} + \alpha * h_{n-1} \quad (10)$$

where $E_{n-1}$ and $h_{n-1}$ are the delayed versions of the decision error $E_n$ and the filtered decision error $h_n$, respectively.

The first computing element 410 computes the difference $d_n = E_n - E_{n-1}$ and the second computing element 420 computes $h_n = d_n + \alpha * h_{n-1}$.

The first computing element 410 includes a delay element 412 and a subtractor 414. The delay element 412 delays the decision error $E_n$ by one sample to generate the delayed decision error $E_{n-1}$. The subtractor 414 subtracts the delayed decision error $E_{n-1}$ from the decision error $E_n$ to provide the error difference $d_n$.

The second computing element 420 includes an adder 422, a delay element 424, and a multiplier 426. The delay element 424 delays the filtered decision error $h_n$ to provide a delayed output $h_{n-1}$. The multiplier 426 multiplies the leakage factor with the delayed output to generate a product $P = \alpha * h_{n-1}$. The adder 422 adds the error difference $d_n$ to the product P to generate the filtered decision error $h_n$.

Figure 5:
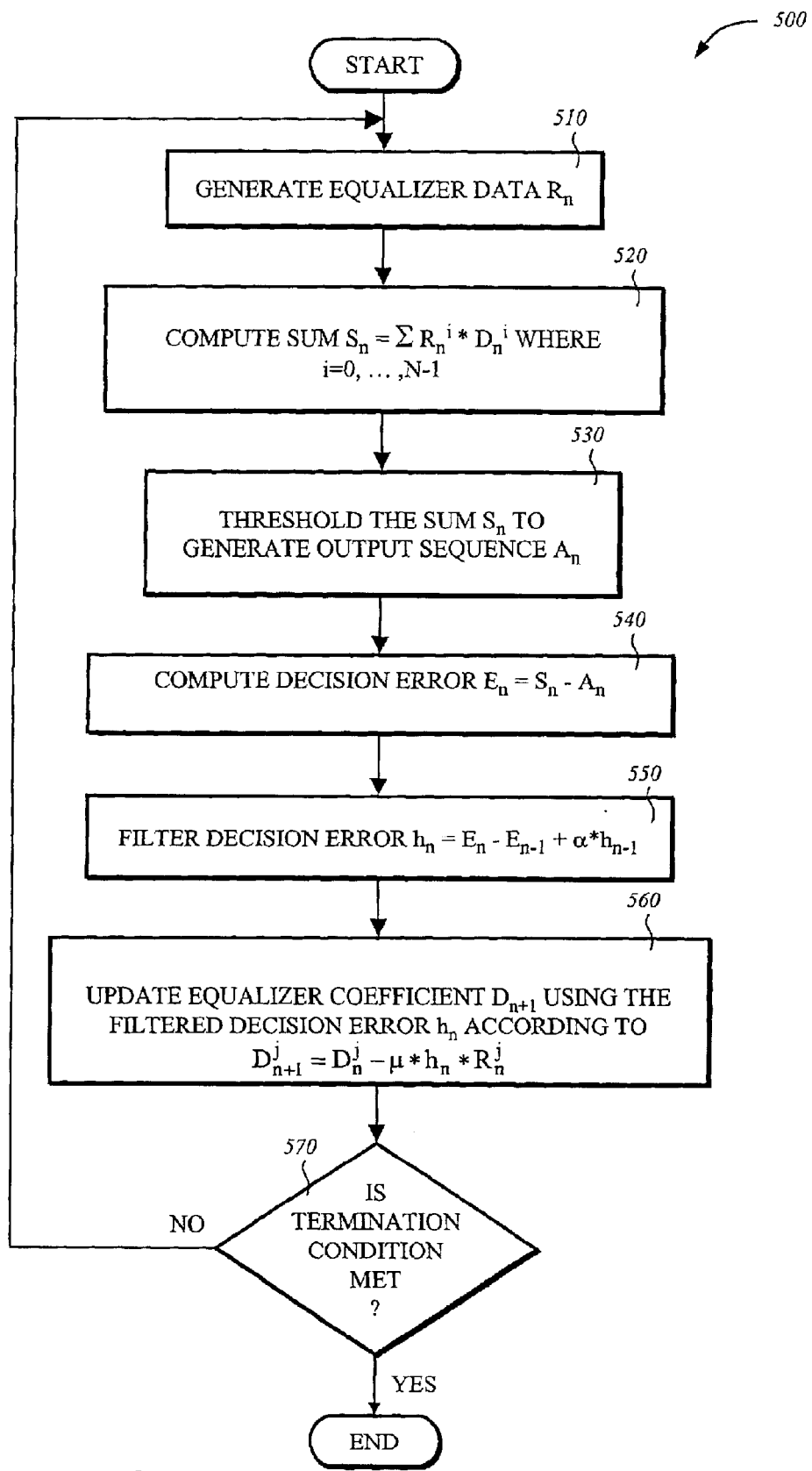
FIG. 5 is a flowchart illustrating a process for adaptive filtering with tap leakage using error filtering according to one embodiment of the invention.

FIG. 5 is a flowchart illustrating a process 500 for adaptive filtering with tap leakage using error filtering according to one embodiment of the invention. It is noted that the START may be located anywhere in the process 500.

Upon START, the process 500 generates equalizer data $\underline{R}_n$ using the N tap delay elements (Block 510). For N taps, the vector of equalizer data $\underline{R}_n$ includes $R_n^0$ to $R_n^{N-1}$. The generation of the equalizer data $R_n$ may be performed by shifting the elements one sample while acquiring the new sample. Next, the process 500 computes the sum $S_n = \Sigma R_n^i * D_n^i$, where i=0, ..., N-1 (Block 520). Then, the process 500 thresholds the sum $S_n$ to generate the output sequence $A_n$ (Block 530). Next, the process 500 computes the decision error $E_n = A_n + S_n$ (Block 540). Then, the process 500 filters the decision error $E_n$ by computing the filtered decision error $h_n = E_n - E_{n-1} + \alpha * h_{n-1}$ in accordance to equation (10) (Block 550). The filtered decision error $h_n$ will be used to update the equalizer coefficients $D_n$.

Next, the process 500 updates the equalizer coefficients $\underline{D}_n$ using the filtered decision error $h_n$ (Block 560). The updated equalizer coefficients $D_n$ are computed according to equation (9).

Next, the process 500 determines if the termination condition has been met (Block 570). This termination condition may be based on a maximum number of iterations, a maximum time period, or when the system stops working. If so, the process 500 is terminated. Otherwise, the process 500 returns to Block 510.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
   an error filter coupled to an adaptive filter having N taps to filter a decision error provided by the adaptive filter using a leakage factor; and
   an updater coupled to the error filter and the adaptive filter to update N equalizer coefficients to the N taps using the filtered decision error, the updater receiving N equalizer data from the N taps.

2. The apparatus of claim 1 wherein the error filter is a high pass filter.

3. The apparatus of claim 1 wherein the error filter is a first-order high pass filter having a pole determined by the leakage factor.

4. The apparatus of claim 1 wherein the error filter has a zero at zero frequency.

5. The apparatus of claim 1 wherein the error filter comprises:
   a first computing element to compute an error difference of the decision error; and
   a second computing element coupled to the first computing element to generate the filtered decision error using the leakage factor.

6. The apparatus of claim 5 wherein the first computing element comprises:
   a delay element to delay the decision error; and
   a subtractor to subtract the delayed decision error from the decision error to provide the error difference.

7. The apparatus of claim 6 wherein the delay element delays the decision error by one sample.

8. The apparatus of claim 5 wherein the second computing element comprises:
   a delay element to delay the filtered decision error to provide a delayed output;
   a multiplier coupled to the delay element to multiply the leakage factor with the delayed output to generate a product; and
   an adder coupled to the multiplier to add the error difference to the product to generate the filtered decision error.

9. The apparatus of claim 8 wherein the delay element delays the filtered decision error by one sample.

10. The apparatus of claim 1 wherein the updater comprises:

N coefficient updaters coupled to the error filter to generate the updated equalizer coefficients using the N equalizer data and the filtered decision error.

11. The apparatus of claim 10 wherein each of the N coefficient updaters comprises:

a first multiplier to multiply a corresponding one of the equalizer data with the filtered decision error to provide a first product;

a second multiplier coupled to the first multiplier to multiply the first product with an adaptive step size to provide a second product;

a delay element to delay a corresponding one of the updated equalizer coefficients to provide a delayed coefficient; and a subtractor coupled to the second multiplier and the delay element to subtract the second product from the delayed coefficient, the subtractor providing the updated filtered coefficient.

12. A method comprising:

filtering a decision error provided by an adaptive filter using a leakage factor, the adaptive filter having N taps; and updating N equalizer coefficients to the N taps using the filtered decision error by an updater, the updater receiving N equalizer data from the N taps.

13. The method of claim 12 wherein filtering the decision error comprises filtering the decision error by a high pass filter.

14. The method of claim 12 wherein filtering the decision error comprises filtering the decision error by a first-order high pass filter having a pole determined by the leakage factor.

15. The method of claim 12 wherein filtering the decision error comprises filtering the decision error by a first-order high pass filter having a zero at zero frequency.

16. The method of claim 12 wherein filtering the decision error further comprises:

computing an error difference of the decision error by a first computing element; and generating the filtered decision error using the leakage factor.

17. The method of claim 16 wherein computing the error difference comprises:

delaying the decision error; and subtracting the delayed decision error from the decision error to provide the error difference.

18. The method of claim 17 wherein delaying the decision error comprises delaying the decision error by one sample.

19. The method of claim 16 wherein generating the filtered decision error further comprises:

delaying the filtered decision error to provide a delayed output;

multiplying the leakage factor with the delayed output to generate a product; and adding the error difference to the product to generate the filtered decision error.

20. The method of claim 19 wherein delaying the decision error comprises delaying the filtered decision error by one sample.

21. The method of claim 12 wherein updating the N equalizer coefficients to the N taps comprises:

generating the updated equalizer coefficients using the N equalizer data and the filtered decision error.

22. The method of claim 21 wherein generating the updated equalizer coefficients comprises:

multiplying a corresponding one of the equalizer data with the filtered decision error to provide a first product;

multiplying the first product with an adaptive step size to provide a second product;

delaying a corresponding one of the updated equalizer coefficients to provide a delayed coefficient; and subtracting the second product from the delayed coefficient to provide the updated filtered coefficient.

23. A computer program product comprising:

a machine useable medium having program code embedded therein, the program code comprising:

computer readable program code to filter a decision error provided by an adaptive filter using a leakage factor, the adaptive filter having N taps; and computer readable program code to update N equalizer coefficients to the N taps using the filtered decision error by an updater, the updater receiving N equalizer data from the N taps.

24. The computer program product of claim 23 wherein the computer readable program code to filter the decision error comprises computer readable program code to filter the decision error by a high pass filter.

25. The computer program product of claim 23 wherein the computer readable program code to filter the decision error comprises computer readable program code to filter the decision error by a first-order high pass filter having a pole determined by the leakage factor.

26. The computer program product of claim 23 wherein the computer readable program code to filter the decision error comprises computer readable program code to filter the decision error by a first-order high pass filter having a zero at zero frequency.

27. The computer program product of claim 23 wherein the computer readable program code to filter the decision error comprises:

computer readable program code to compute an error difference of the decision error; and computer readable program code to generate the filtered decision error using the leakage factor.

28. The computer program product of claim 27 wherein the computer readable program code to compute the error difference comprises:

computer readable program code to delay the decision error; and computer readable program code to subtract the delayed decision error from the decision error to provide the error difference.

29. The computer program product of claim 28 wherein the computer readable program code to delay the decision error comprises computer readable program code to delay the decision error by one sample.

30. The computer program product of claim 27 wherein the computer readable program code to generate the filtered decision error further comprises:

computer readable program code to delay the filtered decision error to provide a delayed output; and computer readable program code to multiply the leakage factor with the delayed output to generate a product; and computer readable program to add the error difference to the product to generate the filtered decision error.

31. The computer program product of claim 30 wherein the computer readable program code to delay the decision error comprises computer readable program code to delay the filtered decision error by one sample.

32. The computer program product of claim method of claim 23 wherein the computer readable program code to update the N equalizer coefficients to the N taps further comprises:

computer readable program code to generate the updated equalizer using the N equalizer data and the filtered decision error.

33. The computer program product of claim 32 wherein the computer readable program to generate the updated equalizer coefficients comprises:

computer readable program code to multiply a corresponding one of the equalizer data with the filtered decision error to provide a first product;

computer readable program code to multiply the first product with an adaptive step size to provide a second product;

computer readable program code to delay a corresponding one of the updated equalizer coefficients to provide a delayed coefficient; and computer readable program code to subtract the second product from the delayed coefficient to provide the updated filtered coefficient.

34. A system comprising:

an adaptive filter having N taps with N equalizer coefficients to generate an output sequence from an input signal, the adaptive filter generating an error decision; and a tap-leakage generator coupled to the adaptive filter comprising:

an error filter coupled to an adaptive filter having N taps to filter the decision error using a leakage factor; and an updater coupled to the error filter and the adaptive filter to update N equalizer coefficients to the N taps using the filtered decision error, the updater receiving N equalizer data from the N taps.

35. The system of claim 34 wherein the error filter is a high pass filter.

36. The system of claim 34 wherein the error filter is a first-order high pass filter having a pole determined by the leakage factor.

37. The system of claim 34 wherein the error filter has a zero at zero frequency.

38. The system of claim 34 wherein the error filter comprises:

a first computing element to compute an error difference of the decision error; and a second computing element coupled to the first computing element to generate the filtered decision error using the leakage factor.

39. The system of claim 38 wherein the first computing element comprises:

a delay element to delay the decision error; and a subtractor to subtract the delayed decision error from the decision error to provide the error difference.

40. The system of claim 39 wherein the delay element delays the decision error by one sample.

41. The system of claim 38 wherein the second computing element comprises:

a delay element to delay the filtered decision error to provide a delayed output;

a multiplier coupled to the delay element to multiply the leakage factor with the delayed output to generate a product; and an adder coupled to the multiplier to add the error difference to the product to generate the filtered decision error.

42. The system of claim 41 wherein the delay element delays the filtered decision error by one sample.

43. The system of claim 34 wherein the updater comprises:

N coefficient updaters coupled to the error filter to generate the updated equalizer coefficients using the N equalizer data and the filtered decision error.

44. The system of claim 43 wherein each of the N coefficient updaters comprises:

a first multiplier to multiply a corresponding one of the equalizer data with the filtered decision error to provide a first product;

a second multiplier coupled to the first multiplier to multiply the first product with an adaptive step size to provide a second product;

a delay element to delay a corresponding one of the updated equalizer coefficients to provide a delayed coefficient; and a subtractor coupled to the second multiplier and the delay element to subtract the second product from the delayed coefficient, the subtractor providing the updated filtered coefficient.

* * * * *